United States Patent

Chen et al.

(10) Patent No.: US 7,962,683 B2
(45) Date of Patent: Jun. 14, 2011

(54) FLASH MEMORY, AND METHOD FOR OPERATING A FLASH MEMORY

(75) Inventors: Chia-Hsin Chen, Taichung (TW); Chun-Kun Lee, Chupei (TW)

(73) Assignee: Silicon Motion, Inc., Jhubei (TW)

( * ) Notice: Subject to any disclaimer, the term of this patent is extended or adjusted under 35 U.S.C. 154(b) by 479 days.

(21) Appl. No.: 12/014,991

(22) Filed: Jan. 16, 2008

(65) Prior Publication Data

US 2009/0049233 A1    Feb. 19, 2009

Related U.S. Application Data

(60) Provisional application No. 60/955,929, filed on Aug. 15, 2007.

(51) Int. Cl.
*G06F 12/00* (2006.01)

(52) U.S. Cl. ............... 711/103; 711/118; 365/189.05

(58) Field of Classification Search .................. 711/103
See application file for complete search history.

(56) References Cited

U.S. PATENT DOCUMENTS

| 2005/0030791 | A1* | 2/2005 | Liang et al. .............. 365/185.11 |
| 2006/0155922 | A1* | 7/2006 | Gorobets et al. ............. 711/103 |
| 2008/0037321 | A1* | 2/2008 | Luo et al. ................. 365/185.03 |
| 2008/0046639 | A1* | 2/2008 | Tsuji ............................ 711/103 |
| 2008/0183949 | A1* | 7/2008 | Ly et al. ....................... 711/103 |

* cited by examiner

*Primary Examiner* — Kaushikkumar Patel
(74) *Attorney, Agent, or Firm* — Grossman, Tucker, Perreault & Pfleger, PLLC

(57) ABSTRACT

A method for operating a flash memory is provided. The flash memory comprises a controller, a cache, and a plurality of blocks. By using a cache to preload data from the host, the buffer of the controller can be smaller than the capacity of a single block or omitted entirely. Smooth data transmission is still maintained.

14 Claims, 6 Drawing Sheets

FLASH MEMORY, AND METHOD FOR OPERATING A FLASH MEMORY

This application claims the benefit of priority based on U.S. Provisional Application No. 60/955,929 filed on Aug. 15, 2007.

CROSS-REFERENCES TO RELATED APPLICATIONS

Not applicable.

BACKGROUND OF THE INVENTION

1. Field of the Invention

The present invention relates to a method for operating a flash memory. More particularly, the present invention relates to a method for operating a flash memory with a cache and a plurality of different blocks.

2. Descriptions of the Related Art

Widely used around the world, flash memories are equipped with a controller and buffer. Conventionally, to access the flash memory, the controller preloads the data from the host into the buffer. Then, the controller writes the preloaded data onto the blocks of the flash memory through a cache. As a result, the buffer capacity cannot be smaller than a single block.

As semiconductor technology develops, block capacities also increase, and density of a flash memory also increases. To ensure smooth data transmission, the increased block capacities leads to a necessary increase in buffer capacities as well. However, using larger buffers mean a higher cost of manufacturing the controllers.

Thus, it is important to maintain smooth data transmission without increasing the buffer capacity.

SUMMARY OF THE INVENTION

The primary objective of this invention is to provide a method for operating a flash memory. The flash memory comprises a cache which is used to preload data from the host before the data is stored into the flash memory during data transmission.

By using the cache, the controller of the flash memory can omit using a buffer or use a buffer smaller than a single block of the flash memory. Smooth data transmission is maintained. To achieve this objective, the blocks of the memory are divided into different categories for data transmission.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the descriptions that follow, the present invention will be described in reference to the embodiments that describe a method of operating a flash memory, and the flash memory that is configured to store data in a novel way. However, embodiments of the invention are not limited to any particular environment, application or implementation. Therefore, the descriptions of the embodiments that follow are for purposes of illustration and not limitation. It is understood that elements indirectly related to the present invention are omitted and are not shown in the following embodiments and drawings.

Figure 1:
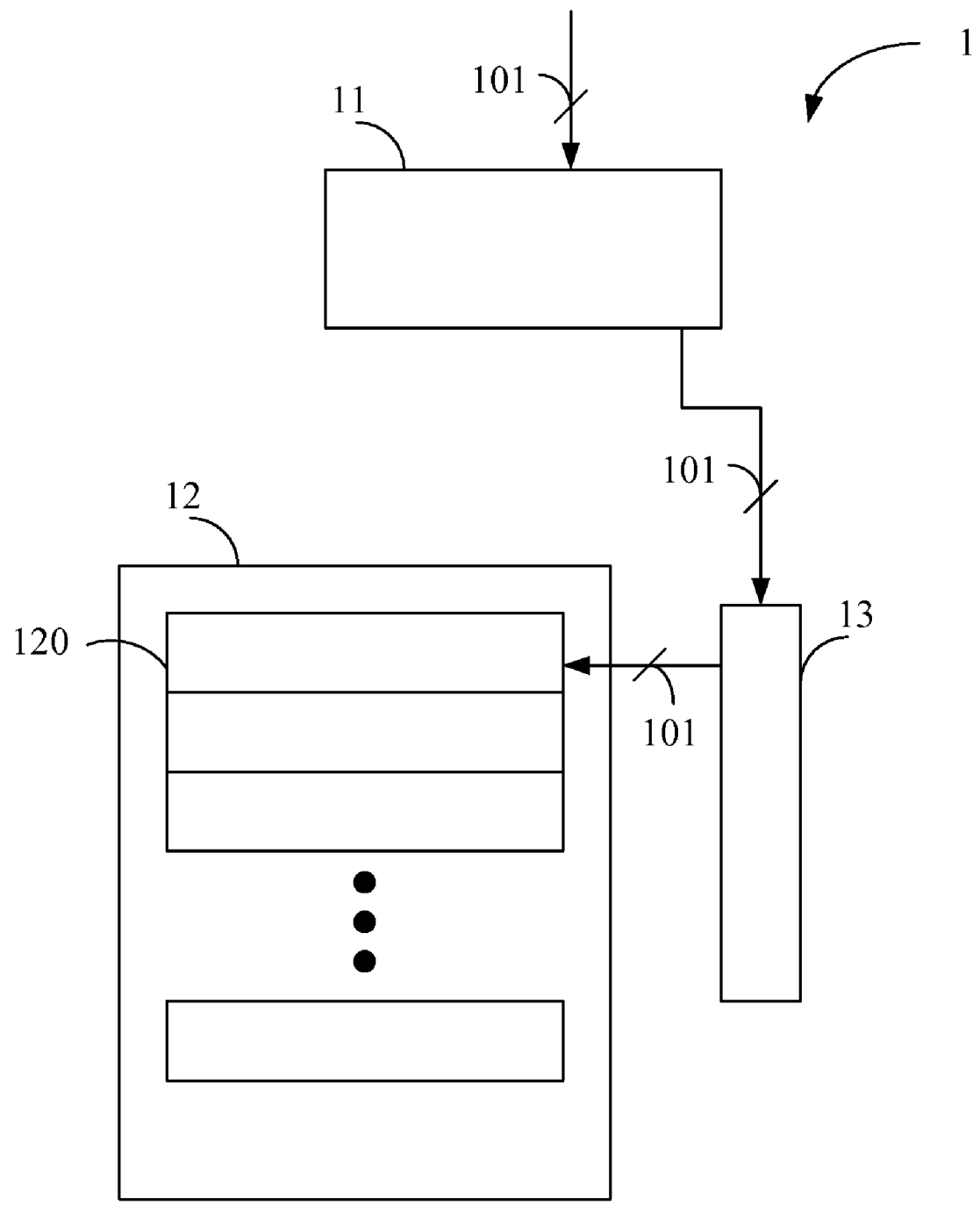
FIG. 1 is a preferred embodiment of the present invention.

FIG. 1 shows the preferred embodiment of the present invention. The preferred embodiment is a flash memory 1 comprising a controller 11, a blocks bank 12, and a cache 13. The blocks bank 12 comprises a plurality of blocks, such as block 120 shown in FIG. 1. The capacity of each block is adapted to a plurality of pages, wherein each page comprises a plurality of sections. In this preferred embodiment, one page comprises eight sections. More particularly, for multi-level-cell (MLC) flash memory, one block comprises 128 pages.

The blocks bank 12 is configured to store data from the host, the cache 13 coupled to the blocks bank 12 and the controller 11, is configured to preload the data. The controller 11 coupled to the cache 13, is configured to determine whether quantity of the data meets a predetermined rule, to generate a judging result, and to render the data to the cache according to the judging result. The details of the predetermined rule and the judging result are described as follows.

During the writing period, the flash memory 1 receives data 101 from the host, such as a PC, while the controller 11 renders the data 101 to the blocks bank 12 via the cache 13. Because the controller 11 writes only one page to the blocks bank 12 at a time, the preloaded data 101 in the cache 13 that is rendered to the blocks bank 12 is equivalent to one page. In this situation, the capacity of the cache 13 is not less than a page. More particularly, in an application, one page can retain 4 k bytes of data.

When the data 101 from the host is less than a page, the controller 11 preloads the data 101 into the cache 13, retrieves temporary data from the blocks bank 12, and sends the temporary data into the cache 13 to fill the page. Then, the controller 11 writes the data 101 and the temporary data to one block of the blocks bank 12.

Figure 2A:
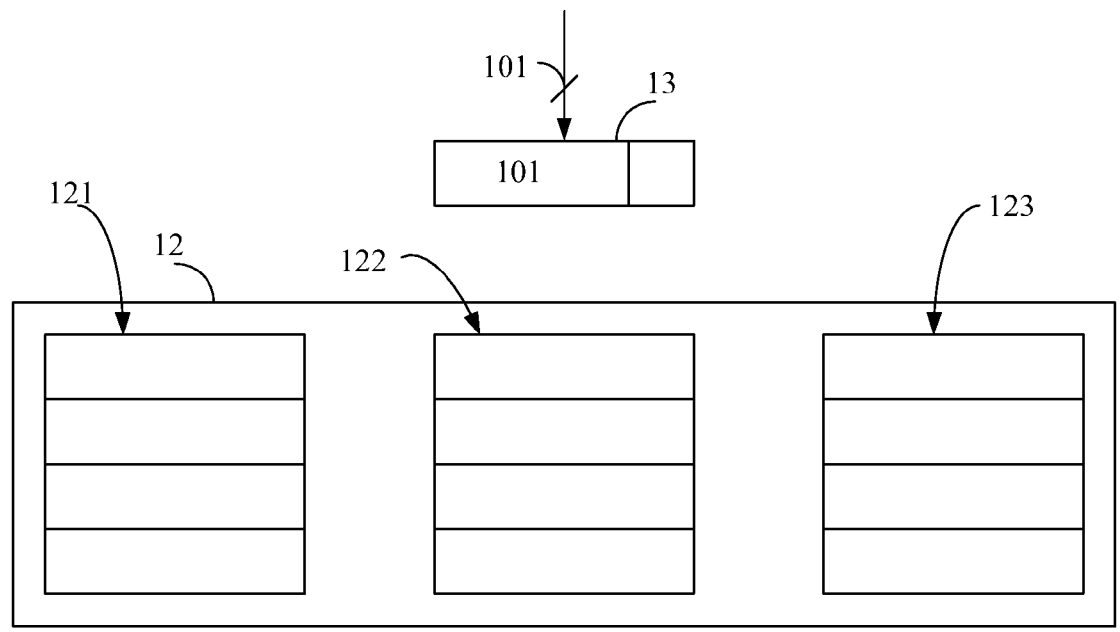
FIGS. 2a-2c are illustrations of the operation of the preferred embodiment.
Figure 2B:
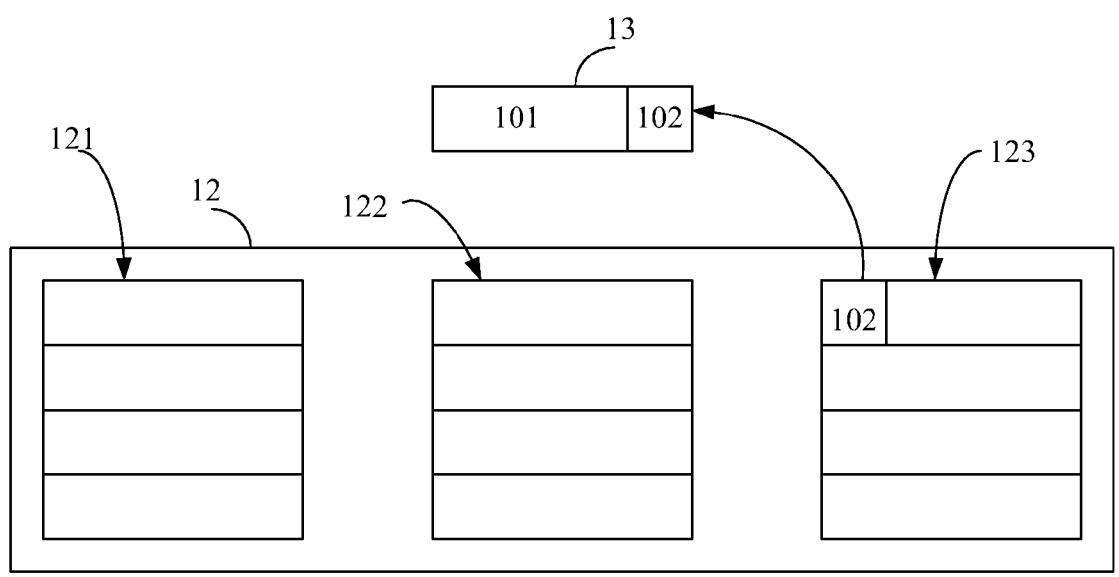
Figure 2C:
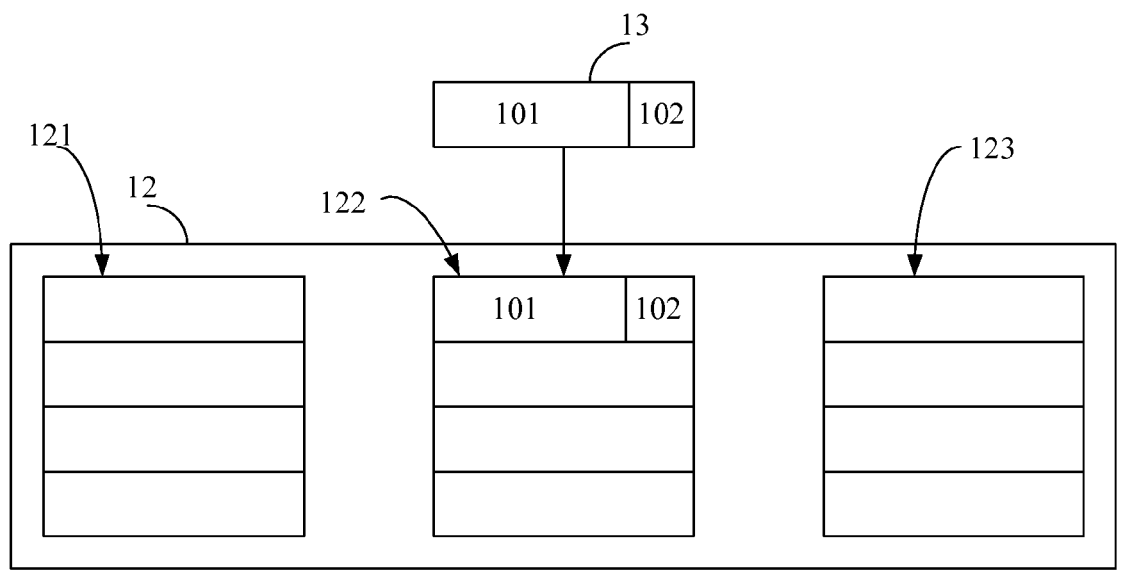

To achieve the above-mentioned operation, the controller 11 divides the blocks bank 12 into three kinds of blocks. In FIGS. 2a-2c, the blocks bank 12 comprises a second region 121, a first region 122, and a third region 123. Each of the first region 122, the second region 121, and the third region 123 comprises at least one block. The following example illustrates an operation of the flash memory 1. Assuming that the data 101 only comprises six sections smaller than eight sections of one full page, FIG. 2a illustrates the controller 11 rendering the data 101 to the cache 13. FIG. 2b illustrates the controller 11 retrieving data 102 with two sections from the third region 123 and sending it to the cache 13. The data 102 is previously stored in the third region 123, and related to the data 101. The data 102 is denoted as a supplementary data to the data 101. Once the data 101 is transmitted to the controller 11, the controller then determines to retrieve the data 102 from the third region 123. FIG. 2c illustrates the controller 11 writing one page with both data 101 and data 102 to the first region 122. When the first region 122 reaches its capacity with a plurality of pages, the controller 11 removes the contents of the first region 122 and places it in the second region 121. The first region 122 is then able to receive new data from the host. That is, the controller 11 renders the data to the first region 122, then moves the data to the second region 121 when the first region 122 is full.

When the first region 122 receives data with redundant sections, the data does not comprise complete pages. As a result, the controller 11 does not write the data with redundant sections onto the first region 122 but instead, onto the third region 123. That is, the controller 11 renders the data to the first region 122, then moves the data to the third region 12 when the first region 122 is not full. In the embodiment, the controller 11 of the flash memory 1 does not need a buffer for temporarily storing data from the host. The cache 13 of the flash memory 1 is assigned to buffer the data before being written onto the blocks bank 12.

Figure 3:
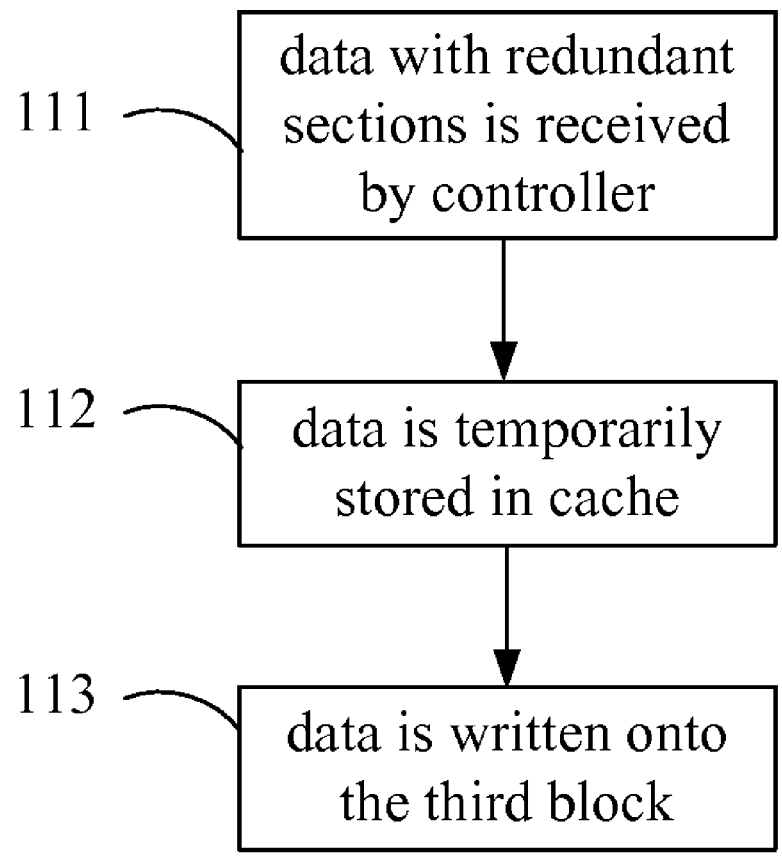
FIG. 3 is a flow chart of the operation of the preferred embodiment shown in FIG. 1.

FIG. 3 shows a flow chart of the flash memory 1 operation. In Step 111, the data with redundant sections is received by the controller 11, in which the data does not comprise complete pages. In Step 112, the data with redundant sections is temporarily stored in the cache 13. In Step 113, the data with redundant sections is written onto the third region 123.

Figure 4:
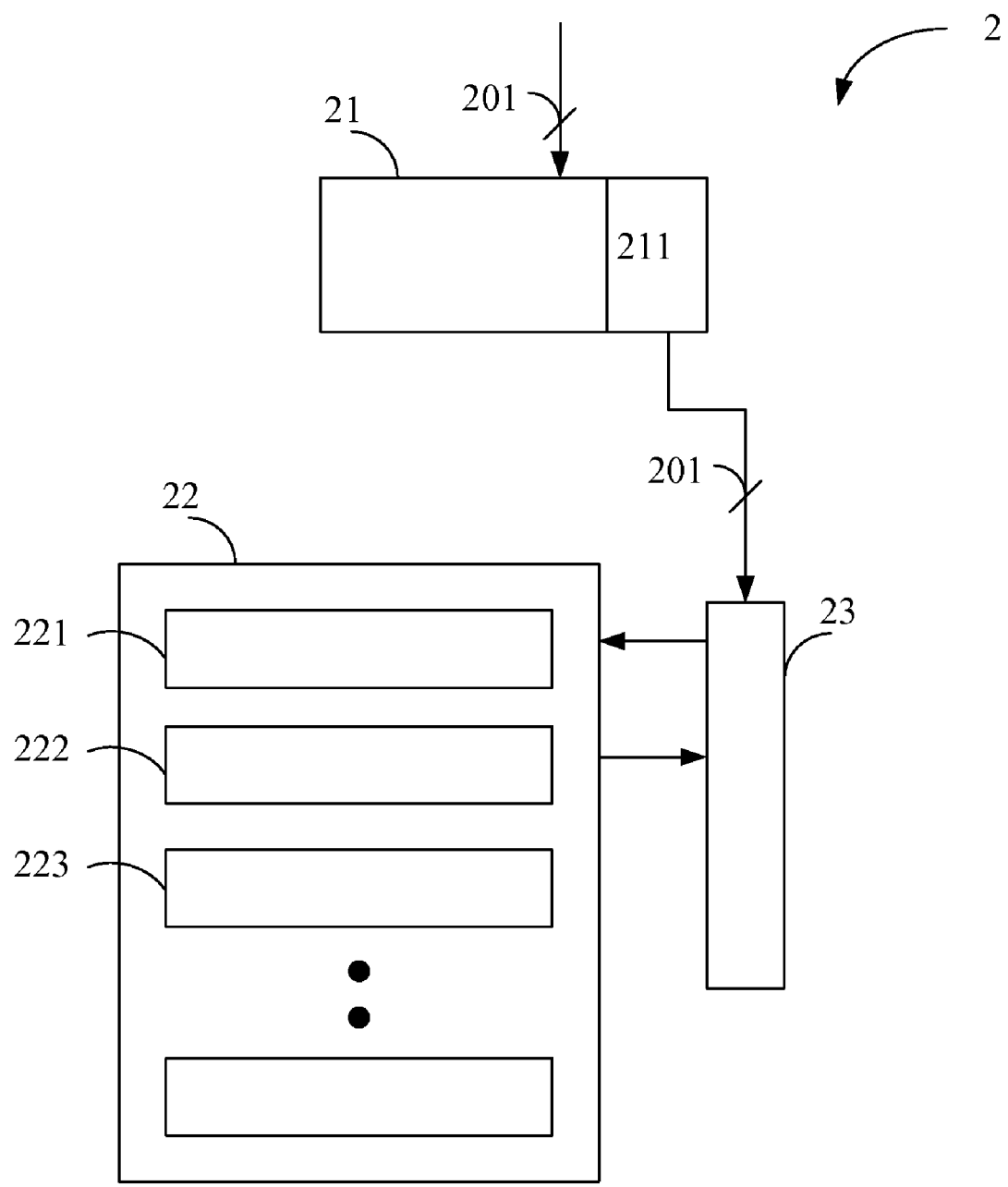
FIG. 4 is another preferred embodiment of the present invention.

FIG. 4 shows another preferred embodiment of the present invention. The preferred embodiment is a flash memory 2 comprising a controller 21, a blocks bank 22, and a cache 23. The blocks bank 22 comprises a plurality of blocks. The capacity of each block is adapted to a plurality of pages, wherein each page comprises a plurality of sections. As aforementioned, for multi-level-cell (MLC) flash memory, one block comprises 128 pages, and the 16 Giga bits memory comprises 4096 blocks. The main difference from the previous embodiment is that the controller 21 herein comprises a buffer 211. The blocks bank 22 comprises a second region 221, a first region 222, and a third region 223. Each block is adapted to a plurality of pages with distinct addresses. The flash memory 2 receives data 201 from a host.

Figure 5:
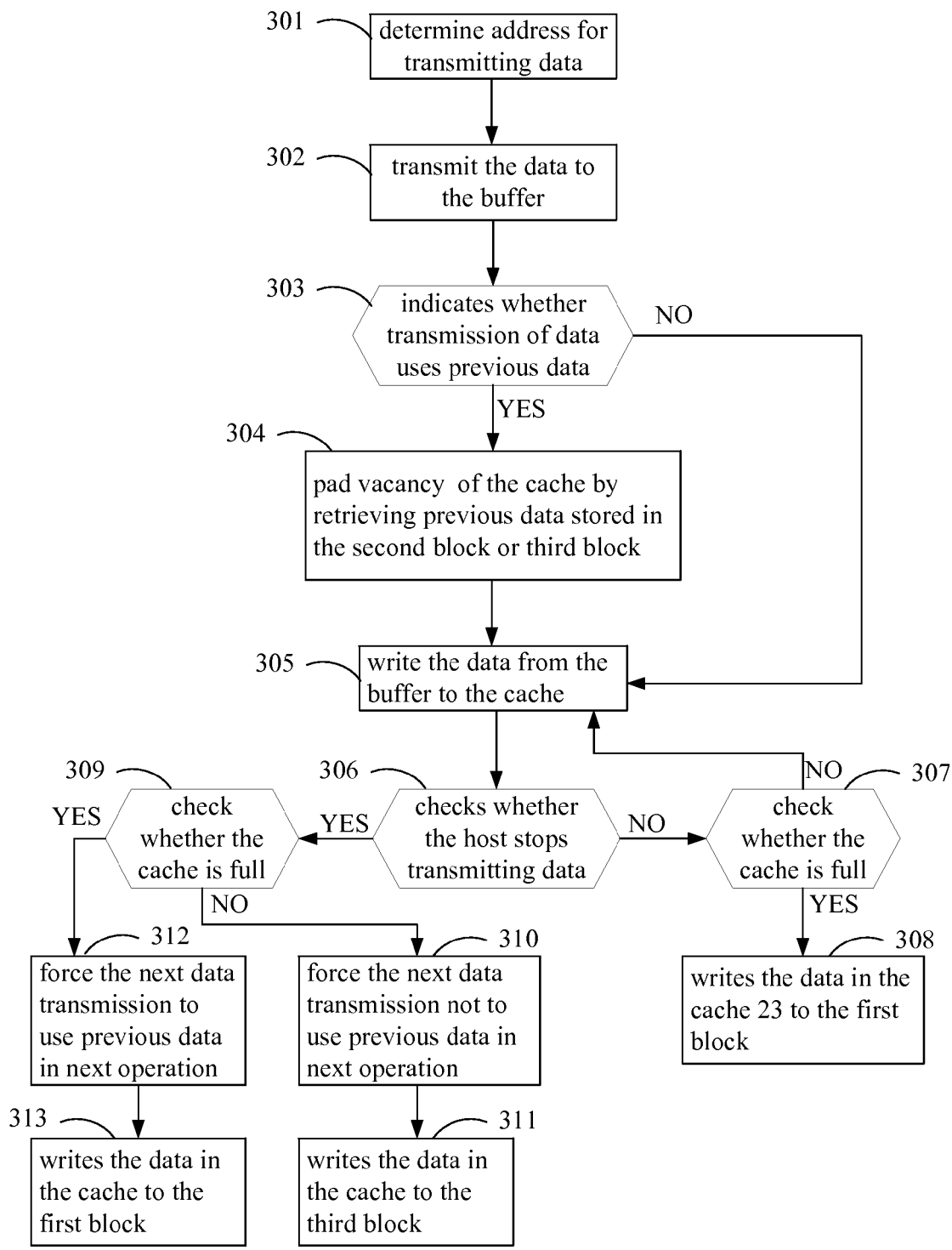
FIG. 5 is a flow chart of the operation of the preferred embodiment shown in FIG. 4.

FIG. 5 shows a flow chart of the flash memory 2 operation. The data 201 is temporarily stored in the buffer 211 before it is transmitted to the blocks bank 22 through the cache 23. In Step 301, the host determines at least one address of the first region 222 for transmitting the data 201. In Step 302, the host transmits the data 201 to the buffer 211 of the controller 21. In Step 303, the controller 21 generating a judging result indicating whether transmission of the data 201 uses a previous data, which is either stored in the second region 221 or in the third region 223. The previous data is previously stored in the third region 223, and related to the data 201, and the previous data is denoted as a supplementary data to the data 201. If the transmission of the data 201 uses the previous data, meaning that the data is less than a page and the data 201 would be written to the cache 23 from the middle position of the cache 23, then Step 304 is executed to add a supplementary data to the data 201 to pad vacancy in front of the middle position of the cache 23. Then, Step 305 is executed to write the data 201 from the buffer 211 to the cache 23. If the transmission of the data 201 does not use previous data, then, Step 305 is executed right after Step 303.

In Step 306, the controller 21 checks whether the host stops transmitting data. If the host does not stop transmitting data, then Step 307 is executed to check whether the cache 23 is full. If the cache 23 is not full, then the flow chart goes to Step 305. On the other hand, the flow chart goes to Step 308, in which the controller 21 writes the data in the cache 23 onto the first region 222.

In Step 306, a transmission status is generated, if the host stops transmitting data, then Step 309 is executed to check whether the cache 23 is full. If the cache 23 is not full, then the flow chart continues to Step 310 to force the next data transmission to not use the previous data from Step 303 according to a transmission mode, which is determined according to the transmission status, and is configured to indicate whether the next transmission of data is forced to use the previous data or not. More particularly, the cache 23 is not full means the data. In Step 311, the controller 21 writes the data in the cache 23 onto the third region 223. On the other hand, if the cache 23 is full, then Step 312 is executed to force the next data transmission to use previous data from Step 303 according to the transmission mode. In Step 313, the controller 21 writes the data in the cache 23 onto the first region 222. It is noted that Step 311 or Step 313 is executed when the controller 21 executes command to access the blocks bank 22. In another embodiment, at least one Step of Steps 308, 311, and 313 comprising Step of executing Error Correction Code (ECC) operation.

When the first region 222 is full, the controller 21 moves the data in the first region 222 to the second region 221 and erases the first region 222 out for storing new data from the host.

By using a cache in the flash memory to preload the data from the host, the buffer of the controller can either be smaller than a single block or be completely omitted. Smooth data transmission is still maintained.

The sequence of Steps in the flow chart is not a limitation of the present invention. People skilled in the art may modify the sequence after realizing the specification. For example, Step 313 may be executed before Step 312, and Step 311 may be executed before Step 310.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A flash memory connected to a host, comprising:
   a blocks bank configured to store data from the host and comprising:
      a first region, comprising at least one block;
      a second region, comprising at least one block;
      a third region, comprising at least one block;
   wherein the data is rendered to the first region and then moved to the third region from the first region when the first region is not full;
   a cache, coupled to the blocks bank, and configured to preload the data;
   a controller, coupled to the cache, and configured to:
      generate a judging result, indicating whether transmission of the data uses a previous data;
      add a supplementary data to the data when the judging result indicates that the transmission of the data uses the previous data;
      transmit the data to the cache;
      generate a transmission status indicating whether the host stops transmitting the data and whether the cache is full or not; and
      determine a transmission mode of a next data transmission according to the transmission status, and the transmission mode indicating whether the next transmission of data is forced to use the previous data or not.

2. The flash memory as claimed in claim 1, wherein the blocks bank comprises a plurality of blocks, and the capacity of each block is adapted to a plurality of pages, the controller renders the data to the blocks bank once the quantity of the data is not less than a page.

3. The flash memory as claimed in claim 2, wherein the controller retrieves supplementary data from the blocks bank, and sends the supplementary data to the cache once the quantity of the data is less than a page, and the supplementary data is sufficient to fill the page.

4. The flash memory as claimed in claim 1, wherein the controller is configured to render the data to the blocks bank from the cache.

5. The flash memory as claimed in claim 4,
wherein the controller renders the data to the first region, then moves the data to the second region from the first region when the first region is full.

6. The flash memory as claimed in claim 1, wherein the controller further comprises a buffer for temporarily storing the data before transmits the data to the cache.

7. A method for operating a flash memory coupled to a host for transmitting data in between, the flash memory including a controller, a cache, and a blocks bank, the method comprising the steps of:
receiving the data from the host;
generating a judging result indicating whether transmission of the data uses a previous data;
adding a supplementary data to the data when the judging result indicates that the transmission of the data uses the previous data;
transmitting the data to the cache;
generating a transmission status indicating whether the host stops transmitting the data and whether the cache is full or not; and
determining a transmission mode of a next data transmission according to the transmission status, and the transmission mode indicating whether the next transmission of data is forced to use the previous data or not.

8. The method as claimed in claim 7, the controller comprising a buffer, and the method further comprising the step of temporarily storing data in the buffer before transmitting the data to the cache.

9. The method as claimed in claim 7, wherein the step of adding a supplementary data to the data is executed when transmission of the data uses the previous data.

10. The method as claimed in claim 7, the blocks bank comprising a first region, comprising at least one block; a second region, comprising at least one block; and a third region, comprising at least one block, wherein the transmission status indicates that the host stops transmitting data, and the cache is full, the step of determining a transmission mode of a next data transmission is executed to force the next data transmission to use the previous data, and the method further comprises the step of writing the data in the cache onto the first region.

11. The method as claimed in claim 7, the blocks bank comprising a first region, comprising at least one block; a second region, comprising at least one block; and a third region, comprising at least one block, wherein the transmission status indicates that the host stops transmitting data, and the cache is not full, the step of determining a transmission mode of a next data transmission is executed to force the next data transmission not to use the previous data, and the method further comprises the step of writing the data in the cache onto the third region.

12. The method as claimed in claim 7, wherein the transmission status indicates that the host continues transmitting data, and the cache is full, the method further comprises the step of writing the data in the cache to the blocks bank.

13. The method as claimed in claim 12, the blocks bank comprising a first region, comprising at least one block; a second region, comprising at least one block; and a third region, comprising at least one block; the method comprising the steps of rendering the data to the first region, then moving the data to the second region when the first region is full.

14. The method as claimed in claim 12, the blocks bank comprising a first region, comprising at least one block; a second region, comprising at least one block; and a third region, comprising at least one block; the method comprising the steps of rendering the data to the first region, then moving the data to the third region when the first region is not full.

* * * * *